(12) United States Patent
Wright et al.

(10) Patent No.: US 8,024,491 B1
(45) Date of Patent: Sep. 20, 2011

(54) DETECTING A CONNECTION TO AN UNPOWERED HOST

(75) Inventors: David Wright, San Diego, CA (US); Shane Abbott, Seattle, WA (US); Derek Richardson, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 256 days.

(21) Appl. No.: 12/195,374

(22) Filed: Aug. 20, 2008

Related U.S. Application Data (60) Provisional application No. 60/956,802, filed on Aug. 20, 2007.

(51) Int. Cl.
*G06F 3/00* (2006.01)
*G06F 13/00* (2006.01)

(52) U.S. Cl. .................. 710/8; 710/5; 710/16; 710/32
(58) Field of Classification Search .................. None
See application file for complete search history.

(56) References Cited

U.S. PATENT DOCUMENTS

| | | | |
|---|---|---|---|
| 6,442,734 B1 | 8/2002 | Hanson et al. | |
| 6,460,094 B1 | 10/2002 | Hanson et al. | |
| 6,625,790 B1 | 9/2003 | Casebolt et al. | |
| 6,691,201 B1 | 2/2004 | Williams et al. | |
| 2003/0135655 A1 | 7/2003 | Chiu et al. | |
| 2007/0260783 A1* | 11/2007 | Combs et al. | 710/62 |
| 2008/0042616 A1* | 2/2008 | Monks et al. | 320/106 |

* cited by examiner

*Primary Examiner* — Tariq Hafiz
*Assistant Examiner* — Scott Sun (57) ABSTRACT

A method and apparatus for detecting a connection between a peripheral device and a host device is described.

17 Claims, 5 Drawing Sheets

FIGURE 5

DETECTING A CONNECTION TO AN UNPOWERED HOST

CROSS-REFERENCE TO RELATED APPLICATIONS

This application claims the benefit of U.S. Provisional Patent Application No. 60/956,802, filed Aug. 20, 2007, which is hereby incorporated by reference.

TECHNICAL FIELD

Embodiments of the present invention relate to connection detection and, in particular, to detection of a cable connection between a peripheral device and an unpowered host device.

BACKGROUND

The Universal Serial Bus (USB) standard was initially offered as a truly easy-to-use universal interface for the PC. Since then, USB has gained widespread acceptance. From the user perspective, the benefits of USB include universal plug-and-play and relative ease-of-use. When a USB peripheral is plugged-in to a USB port on a PC, the system will auto-detect and auto-configure the device. In most cases, there is no user intervention required. This is a significant improvement over the prior technology when a user had to open the PC to install a component. The USB interface also eliminates the need for multiple I/O standards, thereby simplifying PC connectivity for the consumer (as well as simplifying manufacturing for the PC Original Equipment Manufacturers (OEMs).

A USB cable is used to connect a peripheral device with a host device, such as a PC, to enable communication between the devices. A typical USB cable includes a positive voltage (Vcc) line, a ground line, a positive data line, a negative data line, and a cable screen. The Vcc line nominally carries 5 volts and can be used by a host to supply power to a peripheral device. The positive and negative data pins are used to transmit data using differential signaling.

The cable screen is connected to the "shell" of the connector at the host end of the cable. Typically, the corresponding receptacle "shell" is connected to the electrical ground within the host device, but not connected directly to ground inside the peripheral device. In many cases, the screen is connected to ground inside the peripheral via a large resistor and a small capacitor, as this has been found to provide the best compromise between electro-static discharge (ESD) and radio frequency interference (RFI) suppression.

BRIEF DESCRIPTION OF THE DRAWINGS

The present disclosure is illustrated by way of example, and not by way of limitation, in the figures of the accompanying drawings.

DETAILED DESCRIPTION

Described herein is a method and apparatus for detecting a connection between a peripheral device and an unpowered host device. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

When a USB peripheral device is connected to a host device using a USB cable, the host detects the peripheral device and sends the peripheral device a reset signal. The host then determines parameters, such as the data transmission speed supported by the peripheral, and assigns an address to the peripheral. This initiation sequence requires a host that is operational. Nevertheless, some applications may benefit from a connection detection process that does not require a host to be powered. For example, the peripheral device may be a highly sensitive instrument which may be affected by electrical noise on the ground connection resulting from a cable connection to a host device, even if the host is not powered. When the host is in a state, such as an unpowered or hibernate state, where power is not supplied to the host USB port, the usual USB detection mechanism does not detect whether the USB cable is connected to the host.

Embodiments of the invention include a sensor that is configured to determine whether a cable is connected with a host device whether or not power is being supplied to the host USB port by detecting an impedance between a conductor of the cable and a ground of the host device. In one embodiment, the sensor detects the impedance by applying a voltage to the conductor through a pull-up resistor and detecting the voltage of the conductor. In an alternative embodiment the sensor detects the impedance by detecting a current flowing through a second impedance connected between the conductor and a positive voltage source.

Figure 1:
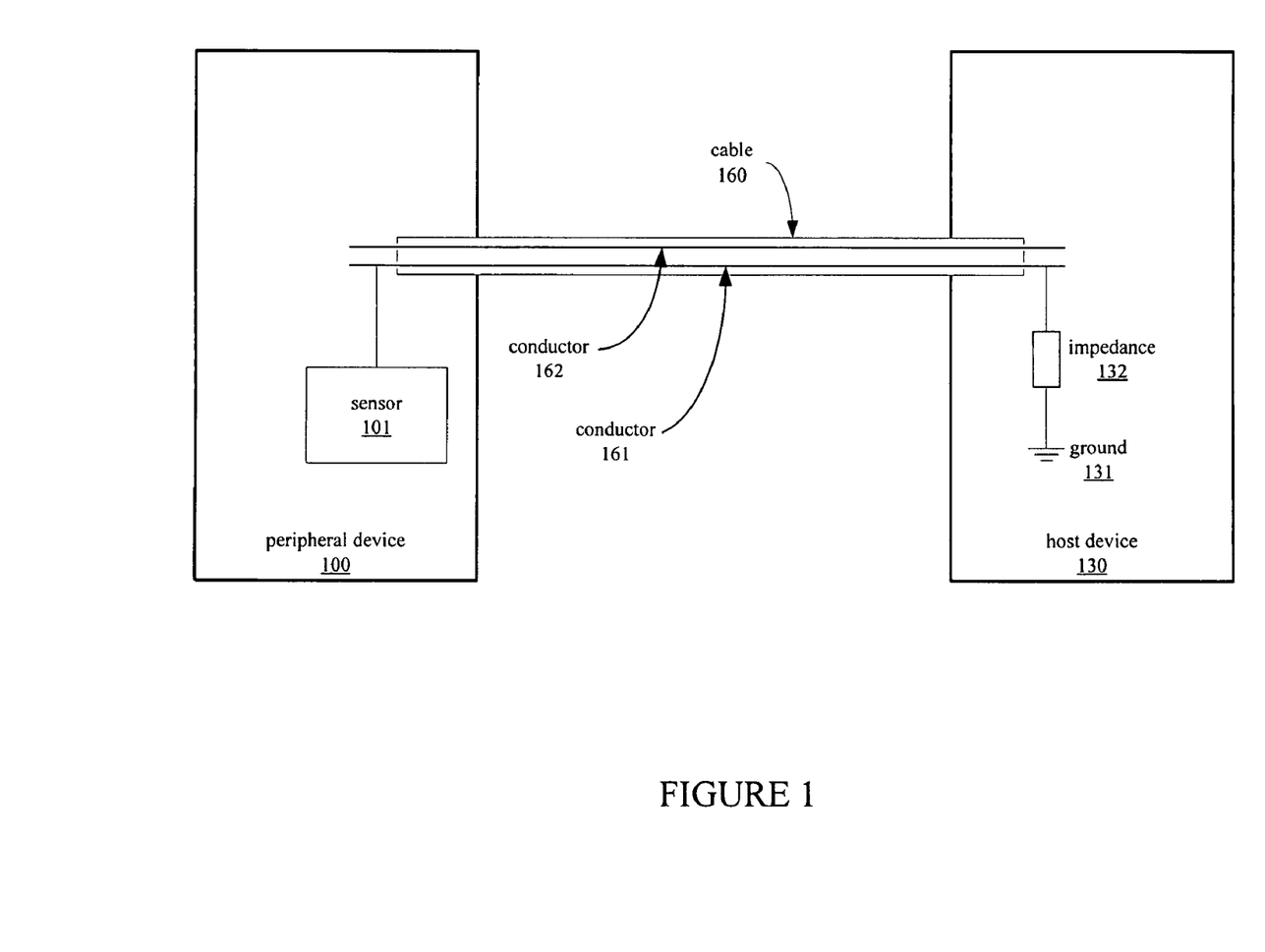
FIG. 1 is a block diagram illustrating one embodiment of a system for detecting a connection to an unpowered host device.

FIG. 1 is a block diagram illustrating one embodiment of a system for detecting a connection between a peripheral device and an unpowered host device. Peripheral device 100 is connected to host device 130 through cable 160. Cable 160 includes conductors 161 and 162. Sensor 101 resides within peripheral device 100 and is coupled with conductor 161. Within host device 130, impedance 132 connects conductor 161 with the ground 131 of the host device 130.

Cable 160 allows communication between peripheral device 100 and host device 130. For example, cable 160 may be a Universal Serial Bus (USB) cable. Cable 160 may include a number of conductors in addition to conductors 161 and 162. These conductors may be used for such functions as power or data transmission between the peripheral 100 and host 130. The conductors 161 and 162 each have one end at the peripheral 100 and an opposite end at the host 130.

Host device 130 may be a personal computer (PC) or other computer system to which a peripheral device 100 may be connected. For example, host 130 may also be a a set-top box, such as a cable television box, a game system, or a hand-held device, such as a cell phone or personal digital assistant (PDA). In one embodiment, peripheral device 100 may be a glucose meter. In alternative embodiments, peripheral device 100 may be industrial sensing or control equipment, or may be any device that can be connected to host device 130.

Peripheral device 100 includes a sensor 101 connected to conductor 161. Sensor 101 is a device that detects a current, voltage, or other electrical characteristic of conductor 161. Sensor 101 may, for example, detect the voltage of conductor 161. Sensor 101 takes measurements from conductor 161 to determine the value of impedance 132, which is situated between conductor 161 and ground 131. Sensor 101 is coupled with the peripheral end of conductor 161.

If the peripheral device 100 is disconnected from host device 130, then conductor 161 is not in contact with impedance 132 or ground 131. Thus, the apparent impedance between conductor 161 and ground 131 of the host device 130 is extremely high. Based on the measured electrical characteristics of conductor 161 that are affected by this high impedance, the sensor 101 can be used to determine that the peripheral device 100 is not connected to the host device 130. For example, the high impedance could prevent current from flowing through conductor 161, and the lack of current can be detected by the sensor 101.

If the peripheral device 100 is connected with host device 130 through cable 160, then the conductor 161 is connected through impedance 132 to ground 131. Thus, the apparent impedance between conductor 161 and ground 131 is equivalent to impedance 132. By measuring electrical characteristics of conductor 161 that are affected by impedance 132, the sensor can be used to determine that the peripheral device is connected to the host device 130.

Since the impedance 132 is passive and does not depend on power being supplied to the host 130, the connection can be detected whether the host is in a powered or an unpowered state. Accordingly, the connection can be detected even if the host is powered off, in a hibernate state, in a suspend state, or in any other state where power is not being supplied to the USB port.

Once the presence of the connection has been determined, the peripheral device may enable or disable certain functions depending on whether or not the peripheral device is connected to the host. The peripheral device 100 may also take some action, such as displaying a warning to a user, if the connection is detected.

Figure 2:
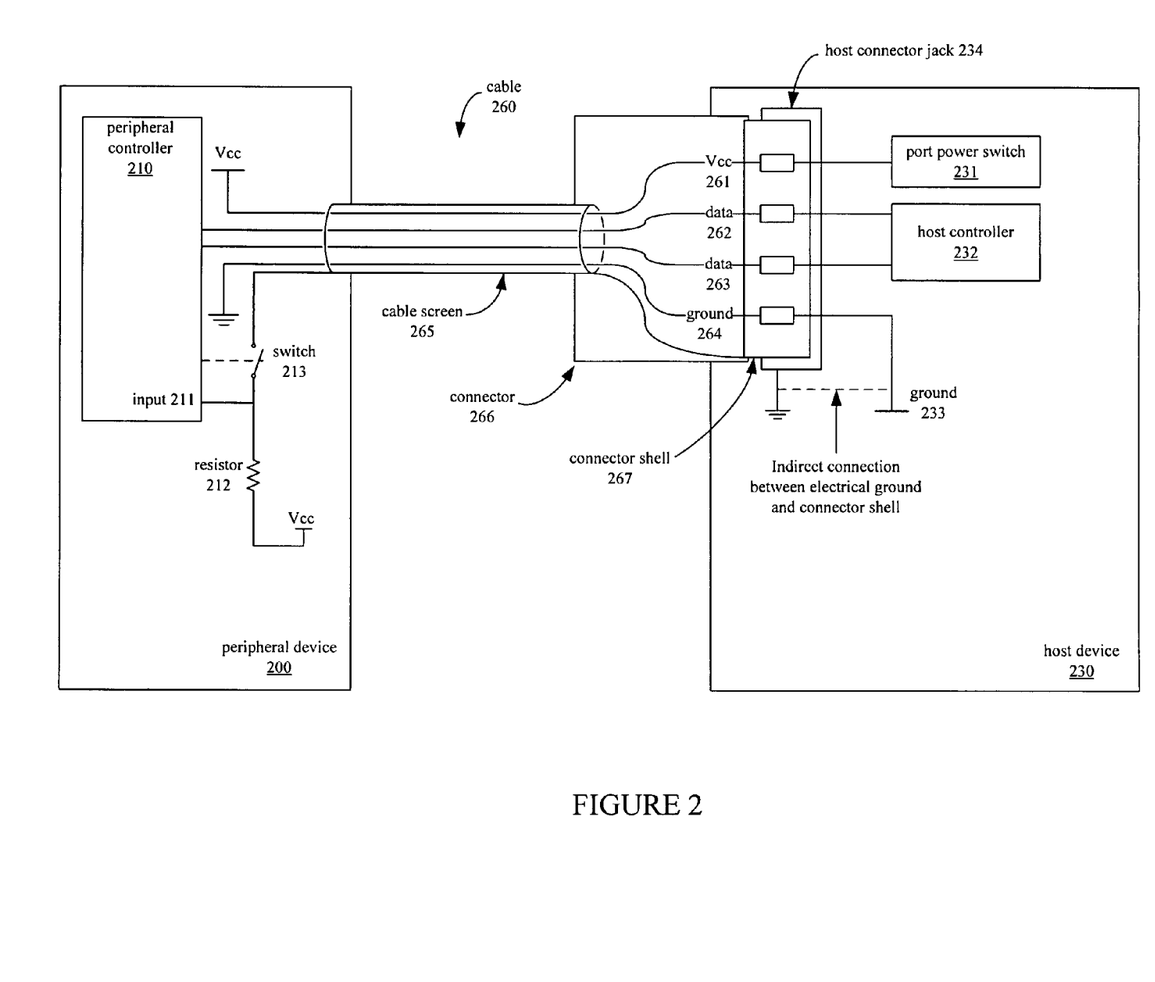
FIG. 2 is a block diagram illustrating one embodiment of a system for detecting a cable connection to an unpowered host device by applying a voltage to a cable screen of the cable.

FIG. 2 is a block diagram illustrating one embodiment of a system for detecting a cable connection between a peripheral device and an unpowered host device by applying a voltage to a cable screen of the cable. Peripheral device 200 is connected to host device 230 through cable 260. Cable 260 includes Vcc line 261, data lines 262 and 263, ground line 264, cable screen 265, connector 266, and connector shell 267. Peripheral device 200 includes peripheral controller 210 with input 211, resistor 212, and switch 213. Host device 230 includes port power switch 231, host controller 232, host ground 233, and host connector jack 234.

Peripheral controller 210 resides in peripheral device 200 and may be an integrated circuit chip. Peripheral controller 210 implements the USB interface by sending data and responding to commands received over the USB interface in accord with the USB specification. In other embodiments, the peripheral controller may implement some other bus or communication protocol, such as Firewire or TCP/IP. In one embodiment, peripheral controller 210 is a Programmable System on a Chip (PSoC™) processing device, manufactured by Cypress Semiconductor Corporation, San Jose, Calif. In one embodiment, the peripheral controller 210 may also include sensor electronics, a display controller, or other electronics in addition to the USB interface.

Peripheral controller 210 is connected to the data lines 262 and 263 of cable 260, and is configured to send data across lines 262 and 263 to the host device 230. Peripheral controller 210 also includes a number of input and output pins that can function as general purpose I/O. Input pin 211 of the peripheral controller 210 is connected through switch 213 to the cable screen 265.

The cable connection also allows the host device 230 to supply power to the peripheral device 200. Cable 260 includes a positive voltage (Vcc) line 261 (sometimes referred to as a Vbus) and a ground line 264. The host supplies a potential difference between Vcc 261 and ground 264 that can be used to fully or partially power the peripheral. When the host device is unpowered, the peripheral may simply operate under its own power.

The cable 260 further includes a cable screen 265, which is made of foil or some other conductive material. The cable screen 265 shields the data lines 262 and 263 from noise and other interference.

Cable screen 265 is connected at the host end of the cable 260 to a connector shell 267. Connector shell 267 is part of connector 266, which mechanically attaches to the host device 230 so that conductors 261, 262, 263, and 264 contact the appropriate pins in the connector jack 234 of the host device 230. Connector shell 267 is a metal casing that contacts the grounded casing of the host connector jack 234 when the cable 260 is connected to the host 230.

When cable 260 is connected to host 230, the conductors 261, 262, 263, and 264 of cable 260 are connected to various signals of the host device 230. The Vcc line 261 is connected to port power switch 231. Port power switch 231 supplies the positive voltage to the Vcc line 261 that can be used to power the peripheral device 200. The ground line 264 of the cable 260 is connected to the ground 233 within the host device 230. The ground 233 of host device 230 is also indirectly connected to connector shell through host connector jack 234.

Also, data lines 262 and 263 are connected to host controller 232 of host 230. Host controller 232 may be an integrated circuit chip that transmits and receives communications over the data lines 262 and 263 according to the USB specification. In alternative embodiments, the host controller 232 operates according to another bus protocol, such as Firewire or TCP/IP.

Peripheral device 200 includes circuitry for detecting the presence of a cable connection with host 230. The circuit for detecting the cable connection includes resistor 212 and switch 213. Resistor 212 is connected between input pin 211 and a positive voltage Vcc. Switch 213 is connected between input pin 211 and cable screen 265. Switch 213 may be implemented as an electrically controlled switch such as a transistor circuit.

When switch 213 is activated, the switch 211 connects Vcc to the cable screen 265 through resistor 212. When switch 213 is not closed, the cable screen remains disconnected from input pin 211 and resistor 212. Switch 213 is controlled by a triggering event, such as the initiation of a particular operation of the peripheral device, or the lapse of a periodic time interval. If switch 213 is controlled by a triggering event, it can be used to detect the cable connection only at specific times, such as when a particular function of the peripheral 200 is invoked. If switch 213 is controlled by a timer, then it can be used to detect the cable connection at periodic intervals.

The cable screen further remains disconnected from the host ground 233 when cable 260 is disconnected from the host 230. Thus, a high impedance is present between cable screen 265 and ground 233 when the cable 260 is disconnected.

In contrast, when the cable 260 is connected to the host 230, the cable screen 265 is connected to ground 233 through the connector shell 267 and host connector jack 234. Thus, a low impedance is present between the cable screen 265 and ground 233 when the cable 260 is connected to the host 230.

Figure 3:
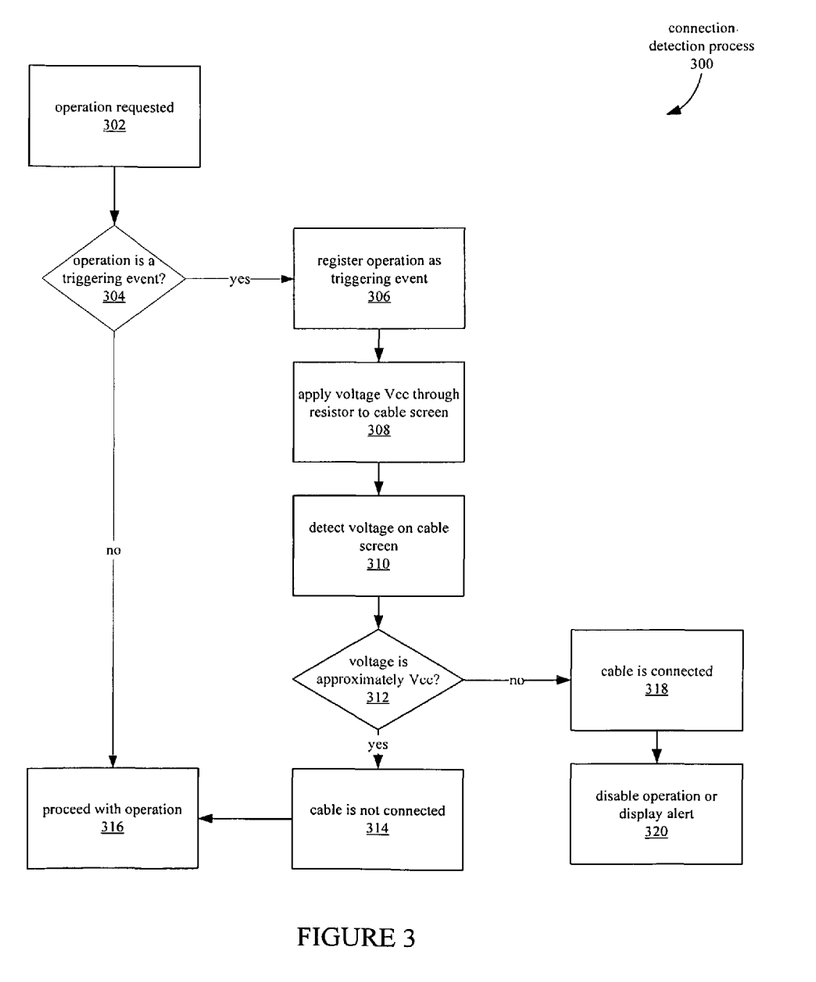
FIG. 3 is a flow chart illustrating one embodiment of a process for detecting a connection to an unpowered host device by applying a voltage to a cable screen of the cable.

FIG. 3 is a flow chart illustrating one embodiment of a process for detecting a connection to an unpowered host device by applying a voltage to a cable screen of the cable. The connection detection process 300 is executed by peripheral controller 210. In alternative embodiments, the process 300 may be executed in a separate processor.

At block 302 of connection detection process 300, an operation is requested at the peripheral device. For example, if the peripheral device is an instrument for taking measurements, a user may initiate the acquisition of such a measurement. Aside from measurements, an operation may include various other functions of the peripheral device 200, such as power on, reset, or data transmission.

At block 304, the peripheral device 200 determines whether the operation of block 302 is a triggering event. If the operation is not a triggering event, then execution proceeds to block 316, where the peripheral device 200 proceeds with performing the operation. If the operation is a triggering event, then execution proceeds to block 306.

At block 306, the operation is registered as a triggering event, which initiates the connection detection portion of process 300.

At block 308, the voltage Vcc is applied to cable screen 265. The peripheral controller 210 applies Vcc to cable screen 265 through resistor 212 by closing switch 213.

At block 310, the voltage on the cable screen 265 is detected. The peripheral controller 210 detects the voltage by reading the input pin 211. Input pin 211 is a general purpose input pin capable of detecting a high or low voltage, corresponding to high or low logic, respectively. In alternative embodiments, the input 211 may be an analog input capable of measuring the actual voltage level. In such embodiments, the voltage at the cable screen 265 may be measured with respect to the voltage on ground line 264. In other embodiments, the input 211 may be part of a sensor separate from peripheral controller 210.

At block 312, the peripheral controller 210 determines whether the voltage on the cable screen 265 detected at block 310 is approximately equal to Vcc. Specifically, if the cable screen voltage approximates Vcc, then the input 211 will register a logical high signal. Otherwise, if the cable screen voltage is closer to the ground voltage, then the input 211 will register a logical low signal. In alternative embodiments, the voltage at cable screen 265 may be compared with the voltage on ground line 264. In such embodiments, a cable screen voltage that is within a threshold of the ground line voltage indicates that the cable 260 is connected to host 230.

If the cable 260 is connected to host 230, then the cable screen 265 is connected to ground 233 through connector shell 267 and jack 234. Since a much lower impedance exists between the cable screen 265 and ground 233 than between the cable screen 265 and Vcc, the cable screen voltage approximates the voltage at ground 233. Thus, the cable screen voltage will be registered as a logical low signal at input 211, and indicates a low impedance between the cable screen 265 and ground 233. This further indicates that the cable 260 is connected to the host 230, in accord with block 318.

If peripheral device 200 determines that the cable 260 is connected to host 230, the peripheral device 200 can initiate an action in response, in accord with block 320. For example, the peripheral device 200 may disable or forgo execution of the operation requested at block 302. Alternatively, the peripheral device 200 may display a visual alert or warning to a user of the peripheral device 200, sound an audible alert, or otherwise notify the user of the detected connection. Peripheral controller 210 may include alert circuitry configured to perform a combination of these actions in response to detecting the cable connection.

If the cable 260 is disconnected from host 230, then the cable screen 265 is disconnected from ground 233 so that a high impedance exists between the cable screen 265 and ground 233. Since the impedance between the cable screen 265 and ground 233 is much higher than the impedance between the cable screen 265 and Vcc, the cable screen voltage approximates Vcc. The cable screen voltage is, therefore, registered at the input 211 as a logical high signal, indicating that the cable 260 is not connected to the host 230, in accord with block 314.

If the peripheral device 200 detects that the cable 260 is not connected to host 230, then at block 316 the peripheral device proceeds with the operation requested at block 302.

As an example, peripheral 200 may be a measurement instrument, such as a glucose meter, that is sufficiently sensitive so that even a cable connection to an unpowered or hibernating host affects the precision or accuracy of the measurements. The operation requested at block 302 may be the acquisition of such a measurement. The peripheral 200 can then detect whether a cable connection to the unpowered host 230 exists and prevent the measurement from being taken until the cable 260 is disconnected. Alternatively, the peripheral 200 can warn the user that the measurement precision or accuracy may be affected by the cable connection, or instruct the user to disconnect the cable 260.

Figure 4:
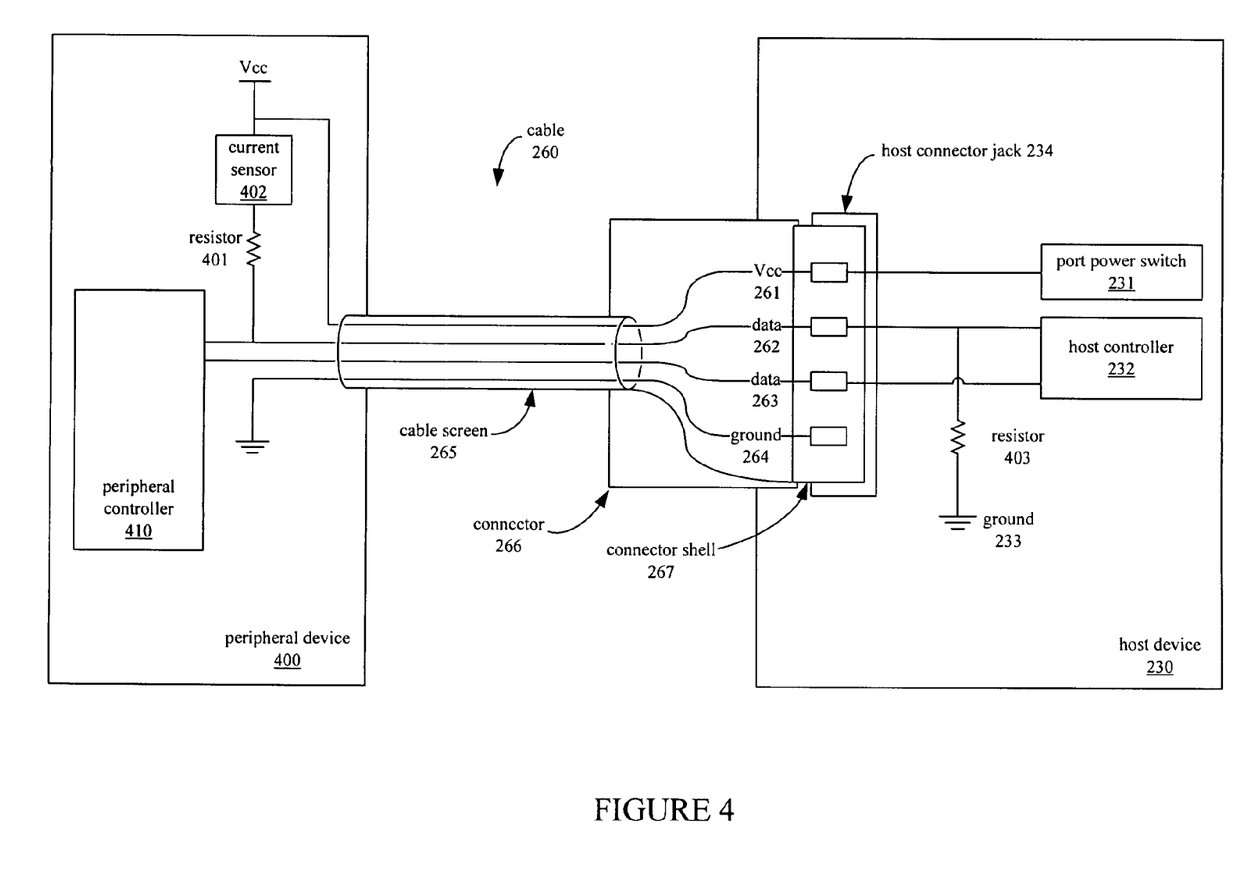
FIG. 4 is a block diagram illustrating one embodiment of a system for detecting a cable connection to an unpowered host device by detecting a current through a conductor of the cable.

FIG. 4 is a block diagram illustrating one embodiment of a system for detecting a cable connection to an unpowered host device by detecting a current through a conductor of the cable.

Peripheral device 400 includes circuitry for detecting the presence of a cable connection with host 230. The circuit for detecting the cable connection includes resistor 401 and current sensor 402. Current sensor 402 and resistor 401 are connected in series between Vcc and data line 262. Host device 230 includes resistor 403 between data line 262 and ground 233.

In one embodiment, resistor 401 is part of the peripheral controller 410. Alternatively, resistor 401 may be a dedicated circuit.

In one embodiment, current sensor 402 is part of the peripheral controller 410. Alternatively, current sensor 402 may be a dedicated circuit.

When the cable 260 is connected to host device 230, the resistor 403 connects data line 262 to ground 233. Thus, when the cable 260 is connected to host 230, a conductive path including current sensor 402, resistor 401, data line 262, and resistor 403 connects Vcc to ground 233.

When the cable 260 is disconnected from the host 230, data line 262 is disconnected from resistor 403 and ground 233. Thus no conductive path exists between Vcc and ground 233 when the cable 260 is disconnected.

In an alternative embodiment, data line 263 is used in place of data line 262 such that current sensor 402 and resistor 401 are connected in series between Vcc and data line 263. Data line 263 is also connected to ground 233 through a resistor (not pictured). Data line 263 can be used instead of data line 262 without affecting the basic operation of the connection detection circuitry.

Figure 5:
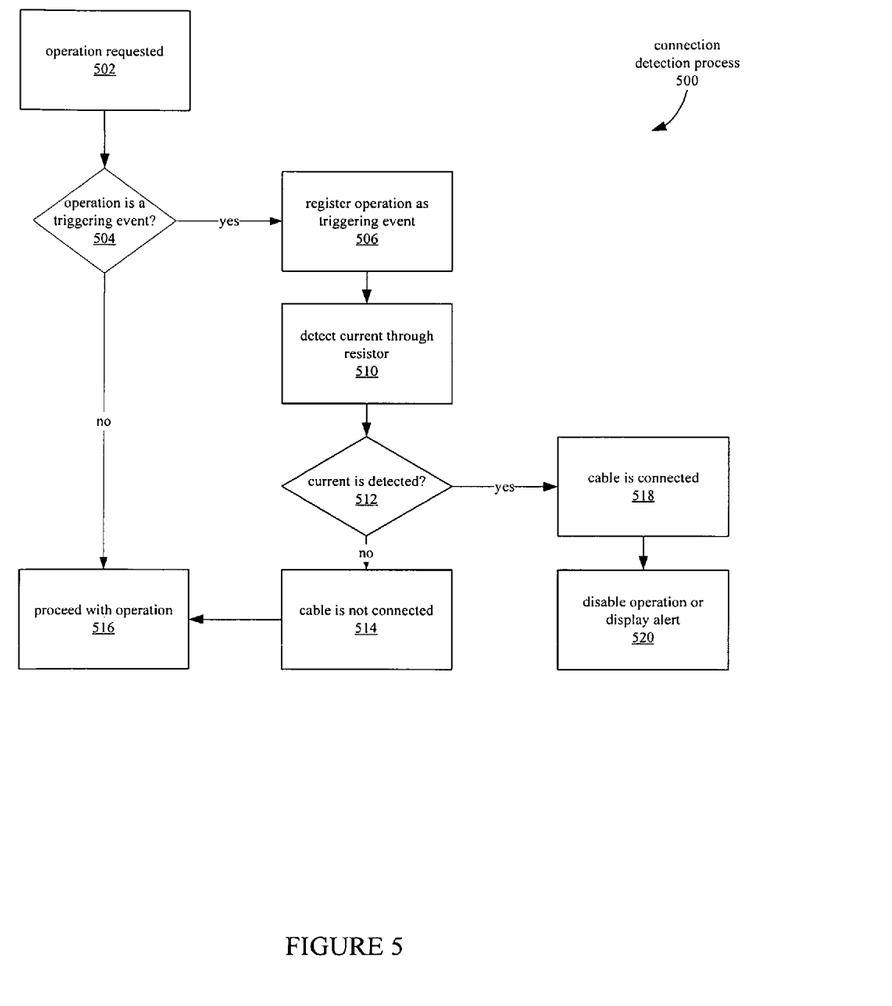
FIG. 5 is a flow chart illustrating one embodiment of a process for detecting a connection to an unpowered host device by detecting a current through a conductor of the cable.

FIG. 5 is a flow chart illustrating one embodiment of a process for detecting a connection to an unpowered host device by detecting a current through a conductor of the cable.

At block 502 of connection detection process 500, an operation is requested at the peripheral device. For example, if the peripheral device is an instrument for taking measurements, a user may initiate the acquisition of such a measurement. Aside from measurements, an operation may include various other functions of the peripheral device 400, such as power on, reset, or data transmission.

At block 504, the peripheral device 400 determines whether the operation of block 502 is a triggering event. If the operation is not a triggering event, then execution proceeds to block 516, where the peripheral device 400 proceeds with performing the operation. If the operation is a triggering event, then execution proceeds to block 506.

At block 506, the operation is registered as a triggering event, which initiates the connection detection portion of process 500.

At block 510, current sensor 402 is used to measure the current passing through resistor 401. The connection between data line 262 and peripheral controller 410 may also be tri-stated or otherwise disconnected so that current does not flow into or out of the peripheral controller 410 during the connection detection process. If the cable 260 is disconnected from host 230, then data line 262 is disconnected from resistor 403 and no conductive path exists between Vcc and ground 233. Furthermore, Vcc, which is supplied by the host 230, is not applied to data line 262 through resistor 401 and current sensor 402 if the cable 260 is not connected. Thus, if the cable 260 is disconnected from the host 230, then current does not flow through current sensor 402 and resistor 401. At block 512, if no current is detected at current sensor 402, then the peripheral device 400 determines that the cable 260 is not connected to the host 230, in accord with block 514.

If the peripheral device 400 detects that the cable 260 is not connected to host 230, then at block 516 the peripheral device proceeds with the operation requested at block 502.

If the cable 260 is connected to host 230, Vcc is applied to data line 262 through resistor 401 and sensor 402, and a conductive path connects Vcc to ground 233. The conductive path includes current sensor 402, resistor 401, data line 262, and resistor 403. The connection between data line 262 and peripheral controller 410 may be tri-stated or otherwise disconnected so that current does not flow into or out of the peripheral controller 410 during the connection detection process.

Since Vcc is a higher voltage than ground 233, current flows through the conductive path and is detected by current sensor 402, in accord with block 510. Assuming a value of 15 kΩ for resistor 403 and a value of 1.5 kΩ for resistor 401, current sensor 402 would detect a current on the order of 20 μA. At block 512, if a current is detected, peripheral device 400 determines that the cable 260 is connected to the host 230, in accord with block 518.

If peripheral device 400 determines that the cable 260 is connected to host 230, the peripheral device can initiate an action in response, in accord with block 520. For example, the peripheral device may disable or forgo execution of the operation requested at block 502. Alternatively, the peripheral device may display a visual alert or warning to the user of the peripheral device 400, sound an audible alert, or otherwise notify the user of the detected connection. Peripheral controller 410 may include alert circuitry configured to perform a combination of these actions in response to detecting the cable connection.

As an example, peripheral 400 may be a measurement instrument, such as a glucose meter, that is sufficiently sensitive so that even a cable connection to an unpowered or hibernating host affects the precision or accuracy of the measurements. The operation requested at block 502 may be the acquisition of such a measurement. The peripheral 400 can then detect whether a cable connection to the unpowered host 230 exists and prevent the measurement from being taken until the cable 260 is disconnected. Alternatively, the peripheral 400 can warn the user that the measurement precision or accuracy may be affected by the cable connection, or instruct the user to disconnect the cable 260.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a computer. The computer-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
    a cable comprising a data line and a cable screen, wherein the cable screen is a conductor configured to shield the data line from interference; and
    a sensor coupled with the cable, wherein the sensor is configured to determine whether the cable is connected to a host device by detecting an impedance between the cable screen and a ground of the host device.

2. The apparatus of claim 1, further comprising:
    a peripheral device;
    the host device; and
    the cable, wherein the cable is configured to connect the peripheral device to the host device.

3. The apparatus of claim 1, wherein the sensor is configured to determine whether the cable is connected to a host device when the host device is in one of an unpowered state and a hibernate state.

4. The apparatus of claim 1, wherein the cable is a Universal Serial Bus (USB) cable.

5. The apparatus of claim 1, wherein the peripheral device is a glucose meter.

6. The apparatus of claim 1, wherein the sensor is further configured to detect whether the connection is present in response to a triggering event.

7. The apparatus of claim 1, further comprising a voltage source coupled with the cable screen through a pull-up resistor, wherein the sensor is integrated with a peripheral controller.

8. The apparatus of claim 7, wherein detecting the impedance between the conductor and the ground of the host device comprises detecting a voltage difference between the cable screen and the ground line of the cable, wherein the sensor detects a connection with the host device if a voltage level of the conductor is within a threshold voltage of the ground line.

9. The apparatus of claim 1, further comprising a peripheral controller configured to disable a function of the peripheral device in response to detecting a connection with the host device.

10. A method, comprising:
    applying a voltage to a conductor of a cable, wherein the cable is configured to connect a peripheral device to a host device, the conductor comprising a cable screen configured to shield a data line in the cable from interference;
    detecting whether a connection is present between the peripheral device and the host device by detecting an impedance between the conductor and a ground of the host device; and
    disabling a function of the peripheral device in response to detecting a connection with the host device.

11. The method of claim 10, wherein the host device is in one of an unpowered state and a hibernate state.

12. The method of claim 10, wherein the cable is a Universal Serial Bus (USB) cable.

13. The method of claim 10, wherein the peripheral device is a glucose meter.

14. The method of claim 10, wherein detecting whether the connection is present occurs in response to a triggering event.

15. The method of claim 10, further comprising applying a voltage to the conductor through a pull-up resistor.

16. The method of claim 10, wherein detecting the impedance between the conductor and the ground of the host device comprises detecting a voltage at an input pin of a peripheral controller.

17. The method of claim 10, wherein detecting the impedance between the conductor and the ground of the host device comprises detecting a voltage difference between the conductor and the ground line of the cable, wherein the sensor detects a connection with the host device if a voltage level of the conductor is within a threshold voltage of the ground line.

* * * * *